(12) United States Patent
Ziegler et al.

(10) Patent No.: US 12,058,105 B1
(45) Date of Patent: Aug. 6, 2024

(54) PATH PRIORITIZATION FOR INTERNET PROTOCOL ADDRESS ALLOCATION ENTITY

(71) Applicant: Juniper Networks, Inc., Sunnyvale, CA (US)

(72) Inventors: John E. Ziegler, Westborough, MA (US); Cristina Radulescu-Banu, Lexington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/452,105

(22) Filed: Aug. 18, 2023

(51) Int. Cl.
*H04L 61/5014* (2022.01)
*H04L 61/5084* (2022.01)

(52) U.S. Cl.
CPC ...... *H04L 61/5014* (2022.05); *H04L 61/5084* (2022.05)

(58) Field of Classification Search
CPC .................. H04L 61/5014; H04L 61/5084
USPC .......................................................... 709/245
See application file for complete search history.

(56) References Cited

U.S. PATENT DOCUMENTS

| 10,778,609 | B2 * | 9/2020 | Peng ................... H04L 61/2592 |
| 2012/0082146 | A1 * | 4/2012 | Andreasen ............. H04L 45/26 370/389 |
| 2014/0235200 | A1 * | 8/2014 | Cai ................... H04W 28/0846 455/406 |
| 2015/0289202 | A1 * | 10/2015 | Gao .................. H04W 72/0446 370/280 |
| 2018/0324140 | A1 * | 11/2018 | Cao ..................... H04L 61/5061 |
| 2023/0171320 | A1 * | 6/2023 | Zhang .................. H04W 76/11 709/227 |

FOREIGN PATENT DOCUMENTS

WO    WO-2017124231 A1 *  7/2017

\* cited by examiner

*Primary Examiner* — Wing F Chan
*Assistant Examiner* — John Fan
(74) *Attorney, Agent, or Firm* — Harrity & Harrity, LLP

(57) ABSTRACT

In some implementations, a network device may obtain a switchover indication associated with a switchover of a group of subscriber sessions from a first user plane subscriber access device to a second user plane subscriber access device. The network device may provide, to the first user plane subscriber access device or the second user plane subscriber access device, an indication to provide, to an internet protocol (IP) address allocation entity for which the network device serves as a relay, an indication to prioritize a path from the IP address allocation entity to the second user plane subscriber access device over a path from the IP address allocation entity to the first user plane subscriber access device.

20 Claims, 9 Drawing Sheets

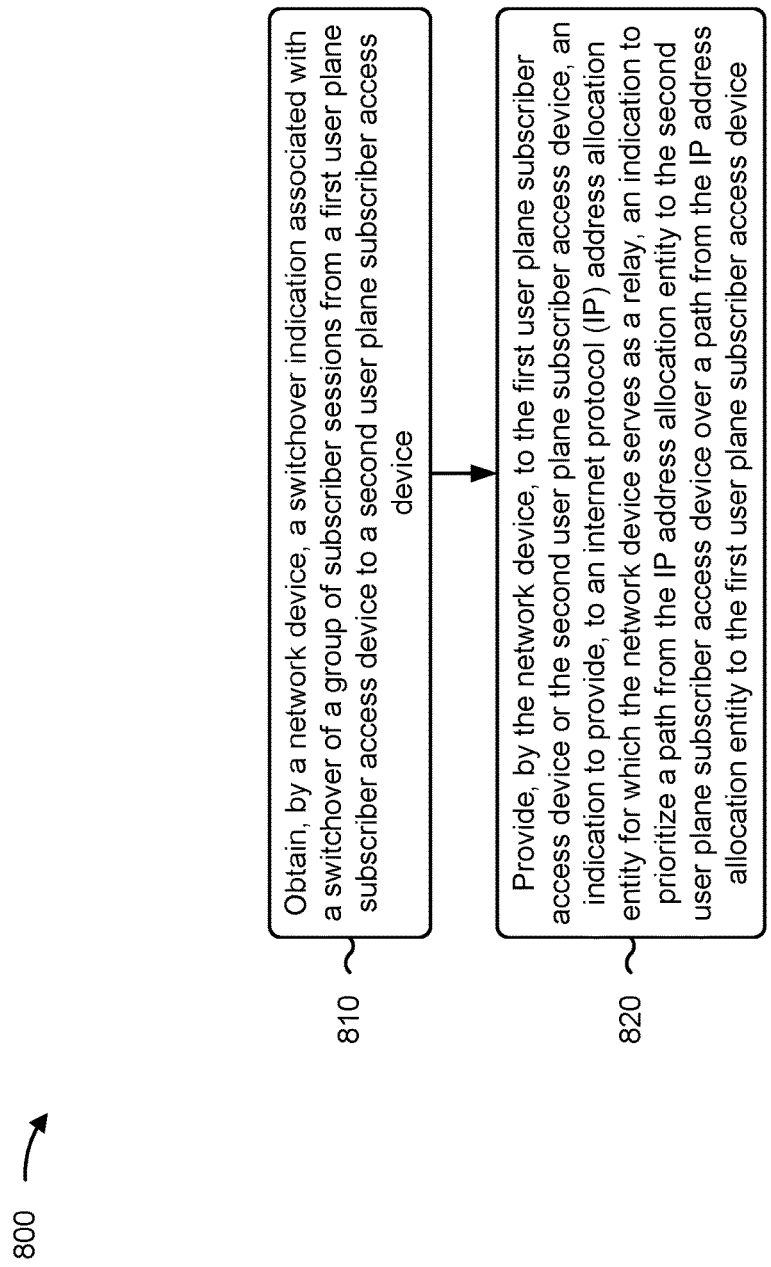

PATH PRIORITIZATION FOR INTERNET PROTOCOL ADDRESS ALLOCATION ENTITY

BACKGROUND

A switchover event prompts a system to switch from one networking device to another. A switchover event can involve a line card or port going down, a geographic region experiencing a natural event (e.g., an earthquake, a tsunami, or the like), or the like. Switchover events are uncontrolled and can occur at any time. For example, a switchover may occur during a discover, offer, request, and acknowledge (DORA) negotiation, a renew or rebind process, a release process, or the like.

SUMMARY

Some implementations described herein relate to a method. The method may include obtaining, by a network device, a switchover indication associated with a switchover of a group of subscriber sessions from a first user plane subscriber access device to a second user plane subscriber access device. The method may include providing, by the network device, to the first user plane subscriber access device or the second user plane subscriber access device, an indication to provide, to an internet protocol (IP) address allocation entity for which the network device serves as a relay, an indication to prioritize a path from the IP address allocation entity to the second user plane subscriber access device over a path from the IP address allocation entity to the first user plane subscriber access device.

Some implementations described herein relate to a network device. The network device may include one or more memories and one or more processors. The one or more processors may be to obtain a switchover indication associated with a switchover of a group of subscriber sessions from a first user plane subscriber access device to a second user plane subscriber access device. The one or more processors may be to provide, to the first user plane subscriber access device or the second user plane subscriber access device, an indication to provide, to an IP address allocation entity for which the network device serves as a relay, an indication to prioritize a path from the IP address allocation entity to the second user plane subscriber access device over a path from the IP address allocation entity to the first user plane subscriber access device.

Some implementations described herein relate to a non-transitory computer-readable medium that stores a set of instructions. The set of instructions, when executed by one or more processors of a network device, may cause the network device to obtain a switchover indication associated with a switchover of a group of subscriber sessions from a first user plane subscriber access device to a second user plane subscriber access device. The set of instructions, when executed by one or more processors of the network device, may cause the network device to provide, to the first user plane subscriber access device or the second user plane subscriber access device, an indication to provide, to an IP address allocation entity for which the network device serves as a relay, an indication to prioritize a path from the IP address allocation entity to the second user plane subscriber access device over a path from the IP address allocation entity to the first user plane subscriber access device.

BRIEF DESCRIPTION OF THE DRAWINGS

FIG. 8 is a flowchart of an example process associated with path prioritization for an IP address allocation entity.

DETAILED DESCRIPTION

Figure 1:
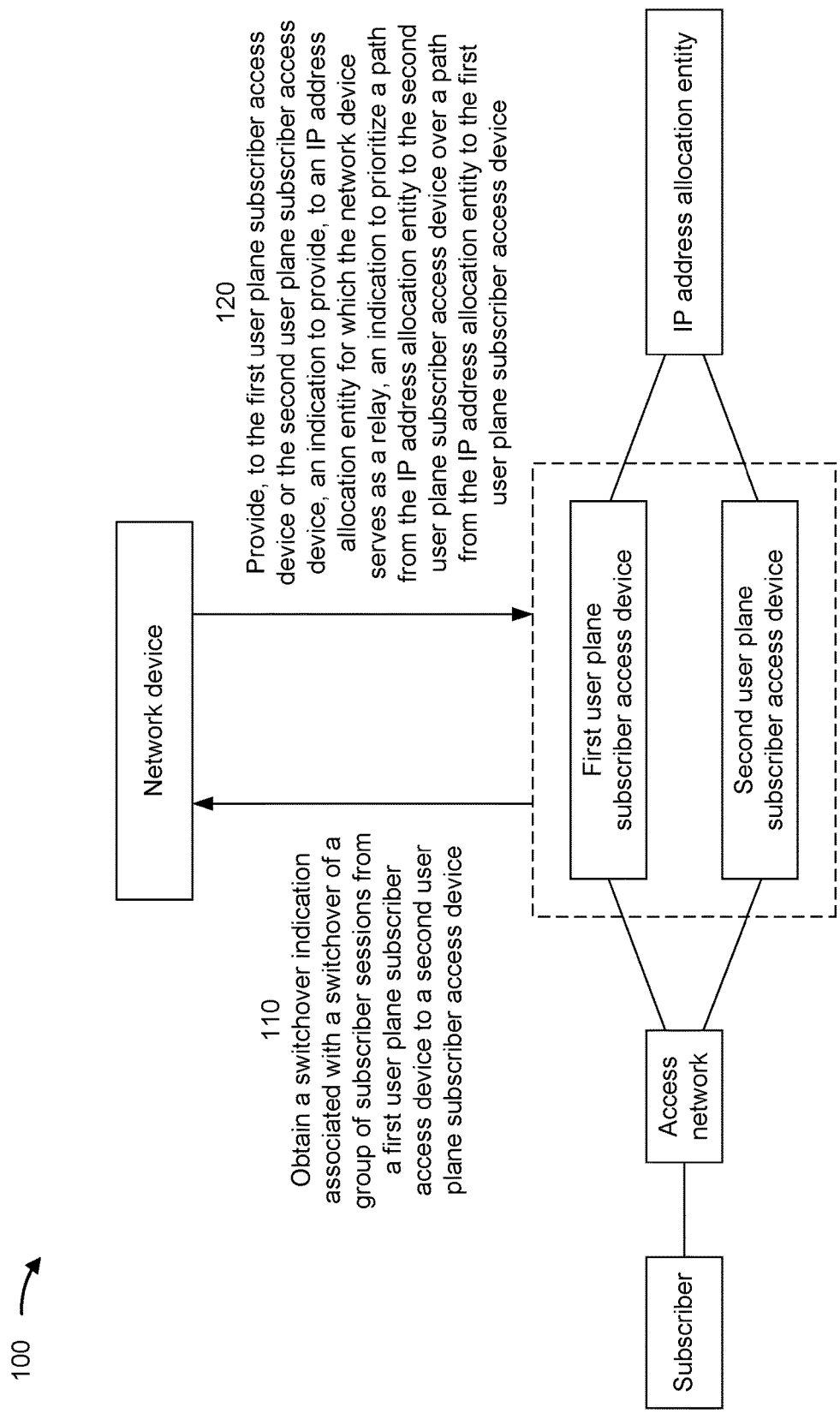
FIG. 1 is a diagram of an example implementation associated with path prioritization for an IP address allocation entity.

The following detailed description of example implementations refers to the accompanying drawings. The same reference numbers in different drawings may identify the same or similar elements.

An IP address allocation entity, such as a dynamic host configuration protocol (DHCP) server or a session management function (SMF) and/or user plane function (UPF), may assign to, and manage IP addresses on behalf of, subscriber devices. An IP address allocation entity may exchange control packets with a subscriber device via a user plane subscriber access device and a control plane subscriber access device. However, when a switchover occurs from the user plane subscriber access device to another user plane subscriber access device, the IP address allocation entity is not notified of the switchover to the other user plane subscriber access device. Therefore, the IP address allocation entity continues to route packets to the user plane subscriber access device, which can result in dropped control packets and ultimately impact user connections.

For example, in a case where the IP address allocation entity is a DHCP server (e.g., in point-to-point protocol over Ethernet (PPPoE) use cases) and the control plane subscriber access device is a DHCP relay, resiliency for subscriber devices may be achieved by using subscriber groups (SGRPs) to failover subscriber traffic without interruption. For example, although dynamic subscriber prefixes may be associated with the SGRP, and policies may be assigned to those prefixes to control the core routing toward active or backup user plane subscriber access devices, the SGRP cannot support resiliency because subscriber IP addresses and prefixes are not known a priori. As a result, the current SGRP, which is based on dynamic prefixes, cannot be used to control the core routing traffic flow.

Some implementations described herein enable a control plane subscriber access device to prioritize network paths based on switchovers between user plane subscriber access devices. In some examples, the control plane subscriber access device may obtain a switchover indication associated with a switchover of a group of subscriber sessions from a first user plane subscriber access device to a second user plane subscriber access device. The control plane subscriber access device may provide, to the first user plane subscriber access device or the second user plane subscriber access device, an indication to provide, to an IP address allocation entity, an indication to prioritize a path from the IP address allocation entity to the second user plane subscriber access device over a path from the IP address allocation entity to the first user plane subscriber access device. The control plane subscriber access device may serve as a relay for the IP address allocation entity (e.g., control packets to or from the IP address allocation entity may be transmitted through the control plane subscriber access device). In some aspects, the first and second user plane subscriber access devices are BNG-UP devices. In some aspects, the first and second user plane subscriber access devices are AGF-UP devices.

The indication to prioritize the path from the IP address allocation entity to the second user plane subscriber access device over the path from the IP address allocation entity to the first user plane subscriber access device may enable the IP address allocation entity to transmit control packets to the second user plane subscriber access device. Thus, the control plane subscriber access device may prevent the IP address allocation entity from transmitting control packets to the first user plane subscriber access device, thereby mitigating dropped control packets after a switchover. Thus, the IP address allocation entity may continue to manage IP address assignments after the switchover without impact to user connections that rely on the assigned IP addresses, which may improve resiliency in the event of a switchover. The first and second user plane subscriber access devices being BNG-UP devices may enable the control plane subscriber access device to prevent impact to user connections in use cases involving broadband network gateways (BNGs). The first and second user plane subscriber access devices being AGF-UP devices may enable the control plane subscriber access device to prevent impact to user connections in use cases involving access gateway functions (AGFs).

FIG. 1 is a diagram of an example implementation 100 associated with path prioritization for an IP address allocation entity. As shown in FIG. 1, example implementation 100 includes a subscriber device (e.g., a residential gateway (RG), customer premises equipment (CPE), a user equipment (UE), and/or the like), an access network (e.g., a layer 2 (L2) access network or the like), a first user plane subscriber access device, a second user plane subscriber access device, an IP address allocation entity, and a network device (e.g., a control plane subscriber access device). These devices are described in more detail below in connection with FIGS. 5-7.

Initially, the subscriber device may be configured to communicate with the IP address allocation entity via the first user plane subscriber access device, with the network device serving as a relay for the IP address allocation entity. For example, the first user plane subscriber access device may be an active user plane subscriber access device for the subscriber device, and the second user plane subscriber access device may be a backup user plane subscriber access device for the subscriber device.

The subscriber device may transmit, via the access network, a control packet to the first user plane subscriber access device, the first user plane subscriber access device may transmit the control packet to the network device, the network device may transmit the control packet back to the first user plane subscriber access device, and the first user plane subscriber access device may transmit the control packet to the IP address allocation entity. In another example, the IP address allocation entity may transmit a control packet to the first user plane subscriber access device, the first user plane subscriber access device may transmit the control packet to the network device, the network device may transmit the control packet back to the first user plane subscriber access device, and the first user plane subscriber access device may transmit, via the access network, the control packet to the subscriber device. In this manner, the IP address allocation entity may assign an IP address to, and/or manage the IP address on behalf of, the subscriber device. Once assigned, the IP address may enable the subscriber device to send and receive communications (e.g., over the Internet).

A switchover event may prompt a switchover from the first user plane subscriber access device to the second user plane subscriber access device. As shown by reference number 110, the network device may obtain a switchover indication associated with a switchover of a group of subscriber sessions from a first user plane subscriber access device to a second user plane subscriber access device. For example, the first user plane subscriber access device and/or the second user plane subscriber access device may inform the network device that a switchover event has occurred and/or that a switchover is to occur. The group of subscriber sessions may include a session associated with the subscriber (e.g., the subscriber may belong to a subscriber group (SGRP) that includes the subscriber and/or one or more other subscribers that share, with the subscriber, similar or the same network traffic characteristics, service level agreements, or the like). The SGRP, including the subscriber, may initially be configured to communicate with the IP address allocation entity via the first user plane subscriber access device.

In some examples, the network device may provide a command, to the first user plane subscriber access device and/or the second user plane subscriber access device, to perform the switchover from the first user plane subscriber access device to the second user plane subscriber access device. As a result of the switchover, the first user plane subscriber access device transitions from an active user plane subscriber access device for the subscriber to a backup user plane subscriber access device for the subscriber, and the second user plane subscriber access device transitions from a backup user plane subscriber access device for the subscriber to an active user plane subscriber access device for the subscriber. In some examples, the switchover may occur on an SGRP-level (e.g., each subscriber in the SGRP may switch over from the first user plane subscriber access device to the second user plane subscriber access device).

As shown by reference number 120, the network device may provide, to the first user plane subscriber access device and/or the second user plane subscriber access device, an indication to provide, to the IP address allocation entity, an indication to prioritize a path from the IP address allocation entity to the second user plane subscriber access device over a path from the IP address allocation entity to the first user plane subscriber access device. The first user plane subscriber access device and/or the second user plane subscriber access device may provide the indication to prioritize the path from the IP address allocation entity to the second user plane subscriber access device over the path from the IP address allocation entity to the first user plane subscriber access device.

Thus, the IP address allocation entity may prioritize the path from the IP address allocation entity to the second user plane subscriber access device over the path from the IP address allocation entity to the first user plane subscriber access device. For example, the IP address allocation entity may transmit control packets over the path from the IP address allocation entity to the second user plane subscriber access device instead of transmitting control packets over the path from the IP address allocation entity to the first user plane subscriber access device. Thus, the path from the IP address allocation entity to the first user plane subscriber access device may be a less preferred route than the path from the IP address allocation entity to the second user plane subscriber access device.

Providing, to the first user plane subscriber access device and/or the second user plane subscriber access device, the indication to provide, to the IP address allocation entity, the indication to prioritize the path from the IP address allocation entity to the second user plane subscriber access device over the path from the IP address allocation entity to the first user plane subscriber access device may enable the IP address allocation entity to transmit control packets to the second user plane subscriber access device. For example, instead of continuing to transmit control packets to the first user plane subscriber access device after the switchover, which would result in dropped control packets, the IP address allocation entity may transmit control packets to the second user plane subscriber access device. Thus, the IP address allocation entity may manage the assigned IP address(es) for the subscriber device after the switchover, thereby improving network connectivity and resiliency.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
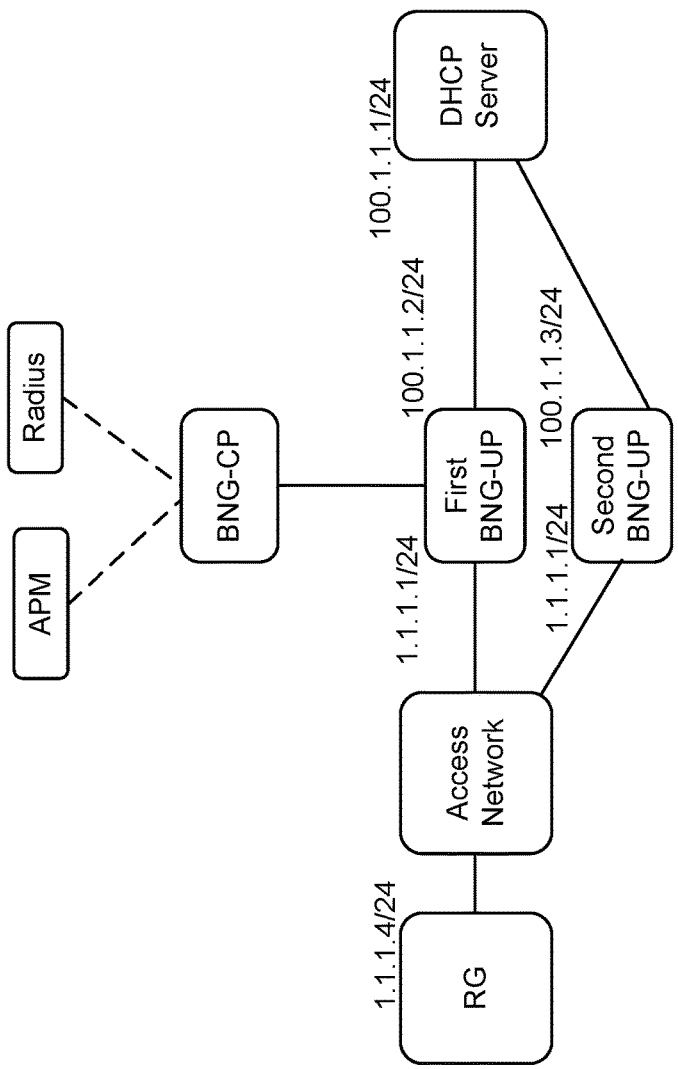
FIG. 2 is a diagram of an example implementation associated with path prioritization for an IP address allocation entity involving broadband network gateway user plane (BNG-UP) devices.

FIG. 2 is a diagram of an example implementation 200 associated with path prioritization for an IP address allocation entity involving BNG-UP devices. As shown in FIG. 2, example implementation 200 includes an RG, an access network, a first BNG-UP device, a second BNG-UP device, a DHCP server, and a broadband network gateway control plane (BNG-CP) device connected to an access policy manager (APM) and a remote authentication dial-in user service (RADIUS) server. The first and second BNG-UP devices may be examples of the first and second user plane subscriber access devices shown in FIG. 1, the DHCP server may be an example of the IP address allocation entity shown in FIG. 1, and the BNG-CP may be an example of the network device shown in FIG. 1.

The RG may communicate with the DHCP server to obtain an IP address. The IP address may be an IPv4 address. The RG and the DHCP server may therefore communicate using DHCP for IPv4 (DHCPv4) to allow the DHCP client to obtain the IP address. A DHCPv4 procedure may involve transmission of DORA packets. For example, the DHCP client may send, to the DHCP server, a discover message requesting an IP address; the DHCP server, based on the discover message, may send, to the RG, an offer message that offers an IP address; the RG, based on the offer message, may send, to the DHCP server, a request message requesting the offered IP address; and the DHCP server, based on the request message, may send, to the RG, an acknowledgment message indicating that the IP address is assigned to the RG.

Alternatively, the IP address may be an IPv6 address. The RG and the DHCP server may therefore communicate using DHCP for IPv6 (DHCPv6) to allow the RG to obtain the IP address. For example, the RG may send, to the DHCP server, a solicit message requesting an IP address; the DHCP server, based on the solicit message, may send, to the RG, an advertise message that offers an IP address; the RG, based on the advertise message, may send, to the DHCP server, a request message requesting the offered IP address; and the DHCP server, based on the request message, may send, to the RG, a reply message indicating that the IP address is assigned to the RG.

In some implementations, the RG may obtain the IP address for a lease period (e.g., that is defined by a lease length). For example, the DHCP server may provide the IP address to the RG for a lease period that begins at a time of obtainment of the IP address and that persists for the lease length. Accordingly, the RG may communicate with the DHCP server to renew the IP address. For example, the RG may determine that the lease period for the IP address is about to expire, and therefore may communicate with the DHCP server to cause the IP address to be renewed.

When the IP address is an IPv4 address, the RG and the DHCP server may therefore communicate using DHCPv4 to renew the IP address. For example, the RG may send, to the DHCP server, a renew message requesting renewal of the IP address; and the DHCP server, based on the renew message, may update the lease period for the IP address and may send, to the RG, an acknowledgment message that confirms renewal of the IP address.

When the IP address is an IPv6 address, the RG and the DHCP server may therefore communicate using DHCPv6 to renew the IP address. For example, the RG may send, to the DHCP server, a renew message requesting renewal of the IP address; and the DHCP server, based on the renew message, may update the lease period for the IP address and may send, to the RG, a reply message that confirms renewal of the IP address.

Initially, the RG may be configured to communicate with the DHCP server via the first BNG-UP device, with the BNG-CP device serving as a relay for the DHCP server. For example, the first BNG-UP device may be an active BNG-UP device for the RG, and the second BNG-UP device may be a backup BNG-UP device for the RG. The first BNG-UP device has an IP address of 100.1.1.2/24, and the second BNG-UP device has an IP address of 100.1.1.3/24. Thus, the source addresses of the core interface toward the DHCP server for the active and backup BNG-UP devices (where one of the first and second BNG-UP devices is active and the other of the first and second BNG-UP devices is backup) may be different. The IP addresses being different (e.g., different for different routers) may help to avoid routing loops.

For control packets transmitted from the RG to the DHCP server, the RG may transmit, via the access network, a control packet to the first BNG-UP device, the first BNG-UP device may transmit the control packet to the BNG-CP device, the BNG-CP device may transmit the control packet back to the first BNG-UP device, and the first BNG-UP device may transmit the control packet to the DHCP server.

The control packet transmitted from the first BNG-UP device to the DHCP server may have a source IP address of 100.1.1.2/24.

For control packets transmitted from the DHCP server to the RG, the DHCP server may transmit a control packet to the first BNG-UP device, the first BNG-UP device may transmit the control packet to the BNG-CP device, the BNG-CP device may transmit the control packet back to the first BNG-UP device, and the first BNG-UP device may transmit, via the access network, the control packet to the RG. The DHCP server may transmit the control packet with a destination IP address set to the gateway IP address (GIADDR) (here, 1.1.1.1/24), where the next hop for the control packet is set to the IP address of the first BNG-UP device (here, 100.1.1.2/24).

A switchover event may occur, and the BNG-CP device may obtain a switchover indication associated with a switchover of a group of subscriber sessions (e.g., including a session associated with the RG) from the first BNG-UP device to the second BNG-UP device. The BNG-CP device may provide, to the first BNG-UP device or the second BNG-UP device, an indication to provide, to the DHCP server, an indication to prioritize a path from the DHCP server to the second BNG-UP device over a path from the DHCP server to the first BNG-UP device.

In some aspects, the indication to provide the indication to prioritize the path from the IP address allocation entity (e.g., the DHCP server) to the second user plane subscriber access device (e.g., the second BNG-UP device) over the path from the IP address allocation entity to the first user plane subscriber access device (e.g., the first BNG-UP device) includes an information element (IE) carried in a user plane subscriber prefix. Table 1 below represents an example of the IE.

TABLE 1

| Octet 1 and 2 | User plane (UP) Subscriber Prefix IE Type = 32801 (decimal) |
|---|---|
| Octets 3 and 4 | Length = n |
| Octets 5 and 6 | Enterprise identifier (ID) 3561 |

| Information elements | P | Condition/Comment | IE Type |
|---|---|---|---|
| SGRP ID | M | This IE may (e.g., must) be present when IP prefix is specified | SGRP ID |
| DHCPv4 server | C | If present, this IE may (e.g., shall) describe a DHCP IPv4 server reachable by DHCP Relay. This IE may be (e.g., is) a IPv4 host address (/32). Several IEs with the same IE type may be present to provision a list of DHCP IPv4 servers, for example. | IPv4 prefix |
| DHCPv6 server | C | If present, this IE may (e.g., shall) describe a DHCP IPv6 Server reachable by DHCPv6 Relay. This IE may be (e.g., is) in a IPv6 host address format (/128 IPv6 address). Several IEs with the same IE type may be present to provision a list of DHCP IPv4 servers, for example. | IPv6 prefix |

For example, the IE may be an SGRP UP prefix IE (e.g., a DHCP server IE) that contains the IP address(es) of one or more DHCP servers. For example, the IE may associate the DHCP server IP address(es) with the SGRP (e.g., the DHCP server IP address may be present in the SGRP), which may indicate that the SGRP covers DHCP relay subscribers. As shown in Table 1, in a case where the DHCP server is a DHCPv4 server, the IE may include information associated with the DHCPv4 server. In a case where the DHCP server is a DHCPv6 server, the IE may include information associated with the DHCPv6 server.

The indication to provide the indication to prioritize the path from the IP address allocation entity to the second user plane subscriber access device over the path from the IP address allocation entity to the first user plane subscriber access device including the IE carried in the user plane subscriber prefix may help to ensure that the DHCP server is reachable through the second BNG-UP device. The IE may enable the core routing path from the DHCP server (e.g., the path from the DHCP server to the second BNG-UP device) to switch on failover in the same way that SGRP dynamic prefixes switch (e.g., where the core routing traffic is controlled by a policy). As a result, the BNG-CP device (e.g., the DHCP relay) may achieve a seamless switchover of the core routing paths. The seamless switchover may involve no loss of traffic (e.g., DHCP control packets). Thus, the BNG-CP device may provide resiliency and support DHCP relay services.

In some aspects, the indication to prioritize the path from the DHCP server to the second BNG-UP device over the path from the DHCP server to the first BNG-UP device may prompt the DHCP server to set the second BNG-UP device as a next hop for DHCP control traffic (e.g., one or more control packets). For example, the DHCP server may transmit a control packet with a destination IP address set to the GIADDR (here, 1.1.1.1/24), where the next hop for the control packet is set to the IP address of the second BNG-UP device (here, 100.1.1.3/24). The DHCP server may transmit the control packet to the second BNG-UP device, the second BNG-UP device may transmit the control packet to the BNG-CP device, the BNG-CP device may transmit the control packet back to the second BNG-UP device, and the second BNG-UP device may transmit, via the access network, the control packet to the RG. Therefore, the DHCP server may transmit control packets over the path from the DHCP server to the second BNG-UP device instead of transmitting control packets over the path from the DHCP server to the first BNG-UP device.

Thus, control packets to and from the DHCP server may follow the same active path (e.g., active UP path), and the control packets transmitted to or from the DHCP server (e.g., via the BNG-CP device) are not sent to the backup BNG-UP. Before the switchover, the control packets to and from the DHCP server are routed through the first BNG-UP device. After the switchover, the control packets to and from the DHCP server are routed through the second BNG-UP device.

DHCP server route manipulation may help to ensure that control packets sent to the DHCP server follow the active path (e.g., via the current active BNG-UP). For example, the backup route to the DHCP server (e.g., as defined by the routing information base (RIB) of the backup BNG-UP device corresponding to the SGRP) may be deprioritized (e.g., not available or less preferred than the active route. Thus, the client path to the DHCP server after the switchover may move to the current active BNG-UP device (e.g., the second BNG-UP device).

GIADDR manipulation may help to ensure that control packets sent from the DHCP server follow the active path. The GIADDR advertisement may follow the SGRP active/backup tag model. For example, the DHCP server may reach the GIADDR via the active BNG-UP device based on the SGRP active/backup tag that has been assigned to the (same) GIADDR.

Prompting the DHCP server to set the second BNG-UP device as the next hop for DHCP control traffic may help to ensure that the relay path to and from the DHCP server uses the active BNG-UP device even after the switchover. For example, the DHCP server may switch the next hop for the DHCP control traffic from the first BNG-UP device to the second BNG-UP device, which may enable the DHCP server to send DHCP control traffic to the second BNG-UP device instead of the first BNG-UP device.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
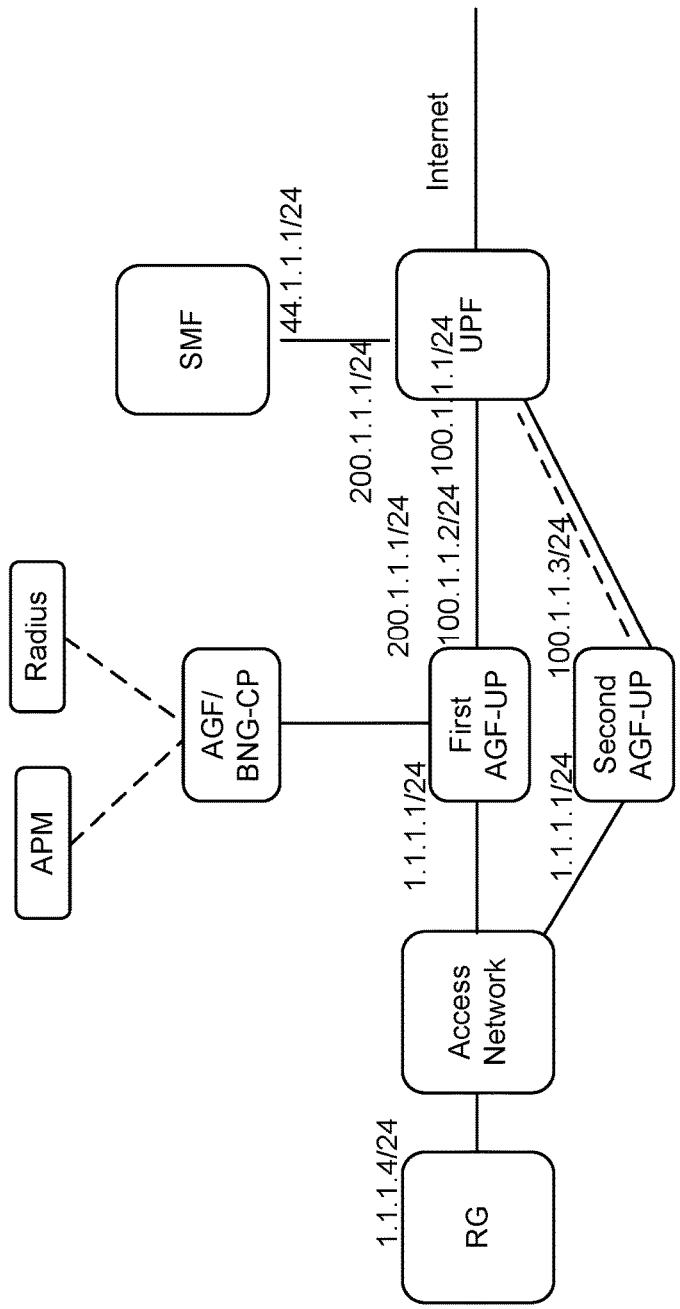
FIG. 3 is a diagram of an example implementation associated with path prioritization for an IP address allocation entity involving access gateway function user plane (AGF-UP) devices.

FIG. 3 is a diagram of an example implementation 300 associated with path prioritization for an IP address allocation entity involving AGF-UP devices. As shown in FIG. 3, example implementation 300 includes an RG, an access network, a first AGF-UP device, a second AGF-UP device, a UPF and an SMF, and a co-located BNG-CP and access gateway function control plane (AGF-CP) device ("BNG-CP/AGF-CP") connected to an APM and a RADIUS server. The first and second AGF-UP devices may be examples of the first and second user plane subscriber access devices shown in FIG. 1, the UPF (and/or the SMF) may be an example of the IP address allocation entity shown in FIG. 1, and the BNG-CP/AGF-CP may be an example of the network device shown in FIG. 1.

The RG may communicate with the UPF and/or SMF to obtain an IP address. For example, the UPF may serve as a proxy for the SMF, which may be responsible for assigning an IP address to, and managing the IP address on behalf of, the RG. The IP address may be an IPv4 address or an IPv6 address. In a case where the IP address is an IPv4 address, the RG and the UPF and/or SMF may exchange DORA packets, as described above. In a case where the IP address is an IPv6 address, the RG and the UPF and/or SMF may exchange solicit, advertise, request, and reply messages, as described above. Additionally, or alternatively, the RG and the UPF and/or SMF may exchange other control packets, such as a renew message.

Initially, the RG may be configured to communicate with the UPF and/or SMF via the first AGF-UP device, with the BNG-CP/AGF-CP device serving as a relay for the UPF and/or SMF. For example, the first AGF-UP device may be an active AGF-UP device for the RG, and the second AGF-UP device may be a backup AGF-UP device for the RG. The first AGF-UP device may have an IP address of 100.1.1.2/24, and the second AGF-UP device may have an IP address of 100.1.1.3/24.

For control packets transmitted from the RG to the UPF and/or SMF, the RG may transmit, via the access network, a control packet to the first AGF-UP device, the first AGF-UP device may transmit the control packet to the BNG-CP/AGF-CP device, the BNG-CP/AGF-CP device may transmit the control packet back to the first AGF-UP device, and the first AGF-UP device may transmit the control packet to the UPF and/or SMF. The control packet transmitted from the first AGF-UP device to the UPF and/or SMF may have a source IP address of 100.1.1.2/24.

For control packets transmitted from the UPF and/or SMF to the RG, the UPF and/or SMF may transmit a control packet to the first AGF-UP device, the first AGF-UP device may transmit the control packet to the BNG-CP/AGF-CP, the BNG-CP/AGF-CP device may transmit the control packet back to the first AGF-UP device, and the first AGF-UP device may transmit, via the access network, the control packet to the RG. The UPF and/or SMF may transmit the control packet with a destination IP address set to the GIADDR (here, 1.1.1.1/24), where the next hop for the control packet is set to the IP address of the first AGF-UP device (here, 100.1.1.2/24).

A switchover event may occur, and the BNG-CP/AGF-CP device may obtain a switchover indication associated with a switchover of a group of subscriber sessions (e.g., including a session associated with the RG) from the first AGF-UP device to the second AGF-UP device. The BNG-CP/AGF-CP device may provide, to the first AGF-UP device or the second AGF-UP device, an indication to provide, to the UPF and/or SMF, an indication to prioritize a path from the UPF and/or SMF to the second AGF-UP device over a path from the UPF and/or SMF to the first AGF-UP device.

In some aspects, the indication to prioritize the path from the UPF and/or SMF to the second AGF-UP device over the path from the UPF and/or SMF to the first AGF-UP device may prompt the UPF and/or SMF to set the second AGF-UP device as a next hop for IP address allocation control traffic (e.g., one or more control packets). For example, the UPF and/or SMF may transmit a control packet with a destination IP address set to the GIADDR (here, 1.1.1.1/24), where the next hop for the control packet is set to the IP address of the second AGF-UP device (here, 100.1.1.3/24). The UPF and/or SMF may transmit the control packet to the second AGF-UP device, the second AGF-UP device may transmit the control packet to the BNG-CP/AGF-CP device, the BNG-CP/AGF-CP device may transmit the control packet back to the second AGF-UP device, and the second AGF-UP device may transmit, via the access network, the control packet to the RG. Therefore, the UPF and/or SMF may transmit control packets over the path from the UPF and/or SMF to the second AGF-UP device instead of transmitting control packets over the path from the UPF and/or SMF to the first AGF-UP device.

Prompting the UPF and/or SMF to set the second AGF-UP device as the next hop for IP address allocation control traffic may help to ensure that the relay path to and from the UPF and/or SMF uses the active AGF-UP device even after the switchover. For example, the UPF and/or SMF may switch the next hop for the IP address allocation control traffic from the first AGF-UP device to the second AGF-UP device, which may enable the UPF and/or SMF to send IP address allocation control traffic to the second AGF-UP device instead of the first AGF-UP device.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4A:
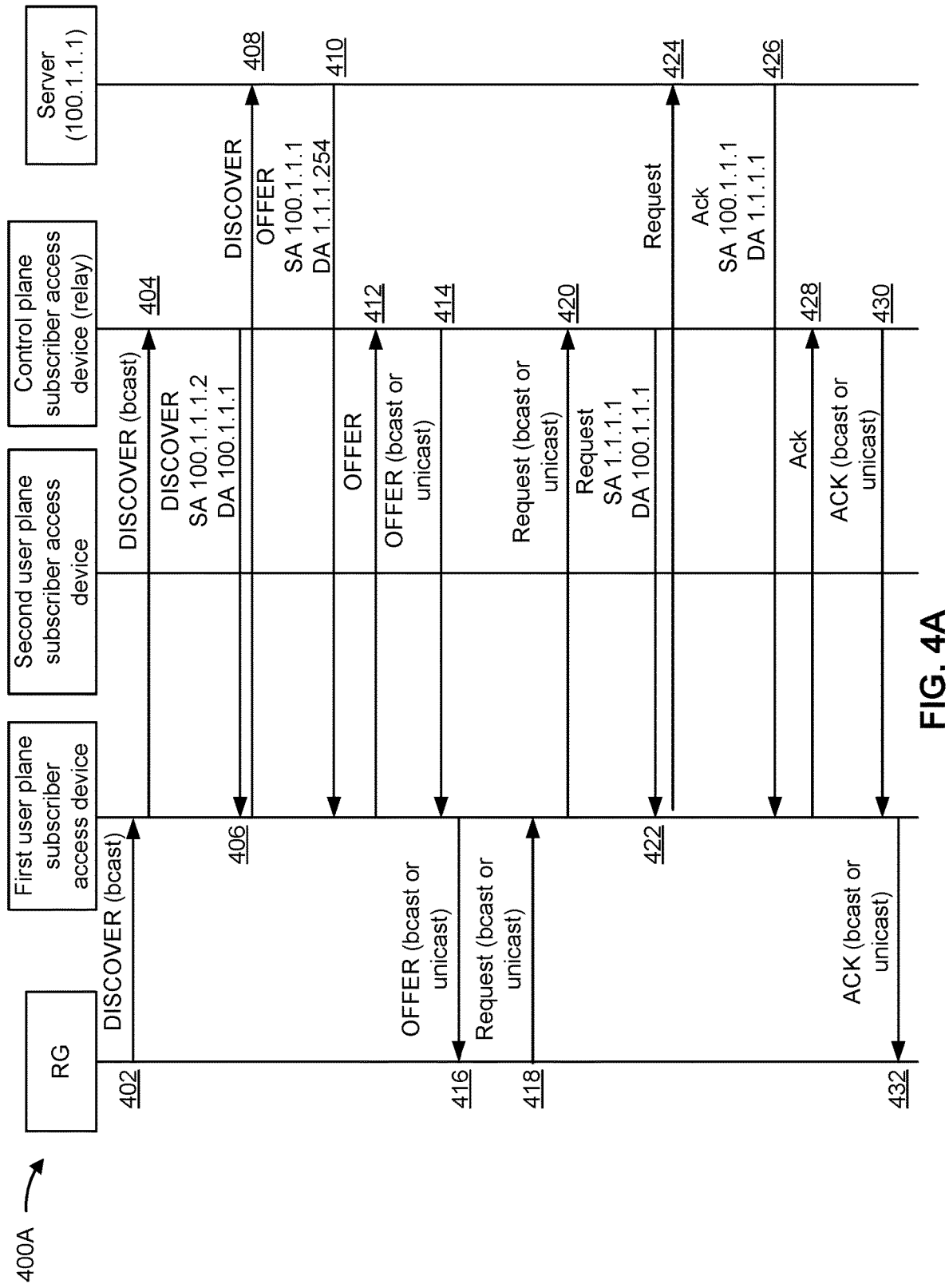
FIGS. 4A and 4B are flow diagrams of example implementations associated with path prioritization for an IP address allocation entity.
Figure 4B:
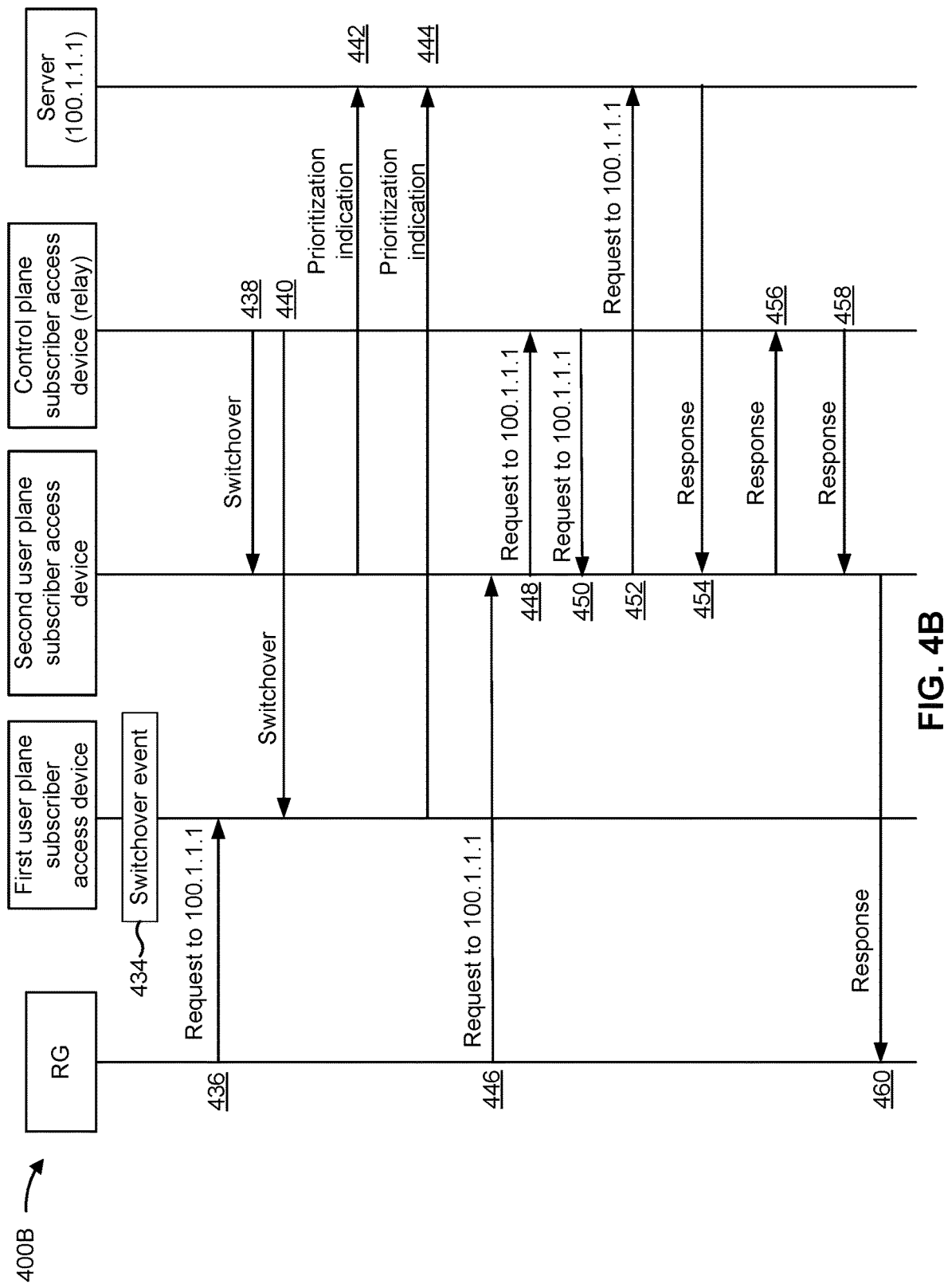

FIGS. 4A and 4B are flow diagrams of example implementations 400A and 400B associated with path prioritization for an IP address allocation entity. Implementations 400A and 400B may apply to any of the examples shown in FIGS. 1-3.

Implementation 400A relates to a pre-switchover (e.g., setup) flow involving the first user plane subscriber access device. As shown by reference number 402, the RG may broadcast a discover packet to the first user plane subscriber access device. As shown by reference number 404, the first user plane subscriber access device may transmit the discover packet to the control plane subscriber access device (which may serve as a relay device). As shown by reference number 406, the control plane subscriber access device may transmit the discover packet back to the first user plane subscriber access device. As shown by reference number 408, the first user plane subscriber access device may transmit the discover packet to a server (e.g., the IP address allocation entity, such as a DHCP server, a UPF and/or SMF, or the like).

As shown by reference number 410, the server may transmit an offer packet to the first user plane subscriber access device. As shown by reference number 412, the first user plane subscriber access device may transmit the offer packet to the control plane subscriber access device. As shown by reference number 414, the control plane subscriber access device may broadcast or unicast the offer packet back to the first user plane subscriber access device. As shown by reference number 416, the first user plane subscriber access device may transmit the control packet to the RG.

As shown by reference number 418, the RG may broadcast or unicast a request packet to the first user plane subscriber access device. As shown by reference number 420, the first user plane subscriber access device may transmit the request packet to the control plane subscriber access device. As shown by reference number 422, the control plane subscriber access device may transmit the request packet back to the first user plane subscriber access device. As shown by reference number 424, the first user plane subscriber access device may transmit the discover packet to the server.

As shown by reference number 426, the server may transmit an acknowledge packet to the first user plane subscriber access device. As shown by reference number 428, the first user plane subscriber access device may transmit the acknowledge packet to the control plane subscriber access device. As shown by reference number 430, the control plane subscriber access device may broadcast or unicast the acknowledge packet back to the first user plane subscriber access device. As shown by reference number 432, the first user plane subscriber access device may transmit the acknowledge packet to the RG.

Implementation 400B depicted in FIG. 4B relates to a post-switchover lease renewal flow involving the second user plane subscriber access device. As shown by reference number 434, a switchover event occurs. The switchover event may occur after the subscriber is logged in (e.g., after the operations shown in FIG. 4A). As shown by reference number 436, the RG transmits a renew packet to the first user plane subscriber access device. Due to the switchover event, the first user plane subscriber access device does not forward the renew packet onward (e.g., the first user plane subscriber access device drops the renew packet).

As shown by reference numbers 438 and 440, the control plane subscriber access device transmits an indication, to the first user plane subscriber access device and the second user plane subscriber access device, to switchover from the first user plane subscriber access device to the second user plane subscriber access device. For example, first user plane subscriber access device may transition from active to backup, and the second user plane subscriber access device may transition from backup to active.

As shown by reference numbers 442 and 444, the first user plane subscriber access device and/or the second user plane subscriber access device may provide, to the server, one or more indications to prioritize a path from the server to the second user plane subscriber access device over a path from the server to the first user plane subscriber access device. For example, the route associated with the first user plane subscriber access device may become less preferred or not available.

As shown by reference number 446, the RG may transmit a renew packet (e.g., a second renew packet) to the second user plane subscriber access device. As shown by reference number 448, the second user plane subscriber access device may transmit the renew packet to the control plane subscriber access device. As shown by reference number 450, the control plane subscriber access device may transmit the renew packet back to the second user plane subscriber access device. As shown by reference number 452, the second user plane subscriber access device may transmit the renew packet to the server.

As shown by reference number 454, the server may transmit, to the second user plane subscriber access device, an acknowledge packet (e.g., a packet that extends a lease for the IP address allocated as a result of the operations shown in implementation 400A). As shown by reference number 456, the second user plane subscriber access device may transmit the acknowledge packet to the control plane subscriber access device. As shown by reference number 458, the control plane subscriber access device may transmit the acknowledge packet back to the second user plane subscriber access device. As shown by reference number 460, the second user plane subscriber access device may transmit the acknowledge packet to the RG. Thus, the renew packet and the corresponding acknowledge packet may follow the same path (e.g., the path over the second user plane subscriber access device).

As indicated above, FIGS. 4A and 4B are provided as an example. Other examples may differ from what is described with regard to FIGS. 4A and 4B. The number and arrangement of devices shown in FIGS. 4A and 4B are provided as an example. In practice, there may be additional devices, fewer devices, different devices, or differently arranged devices than those shown in FIGS. 4A and 4B. Furthermore, two or more devices shown in FIGS. 4A and 4B may be implemented within a single device, or a single device shown in FIGS. 4A and 4B may be implemented as multiple, distributed devices. Additionally, or alternatively, a set of devices (e.g., one or more devices) shown in FIGS. 4A and 4B may perform one or more functions described as being performed by another set of devices shown in FIGS. 4A and 4B.

Figure 5:
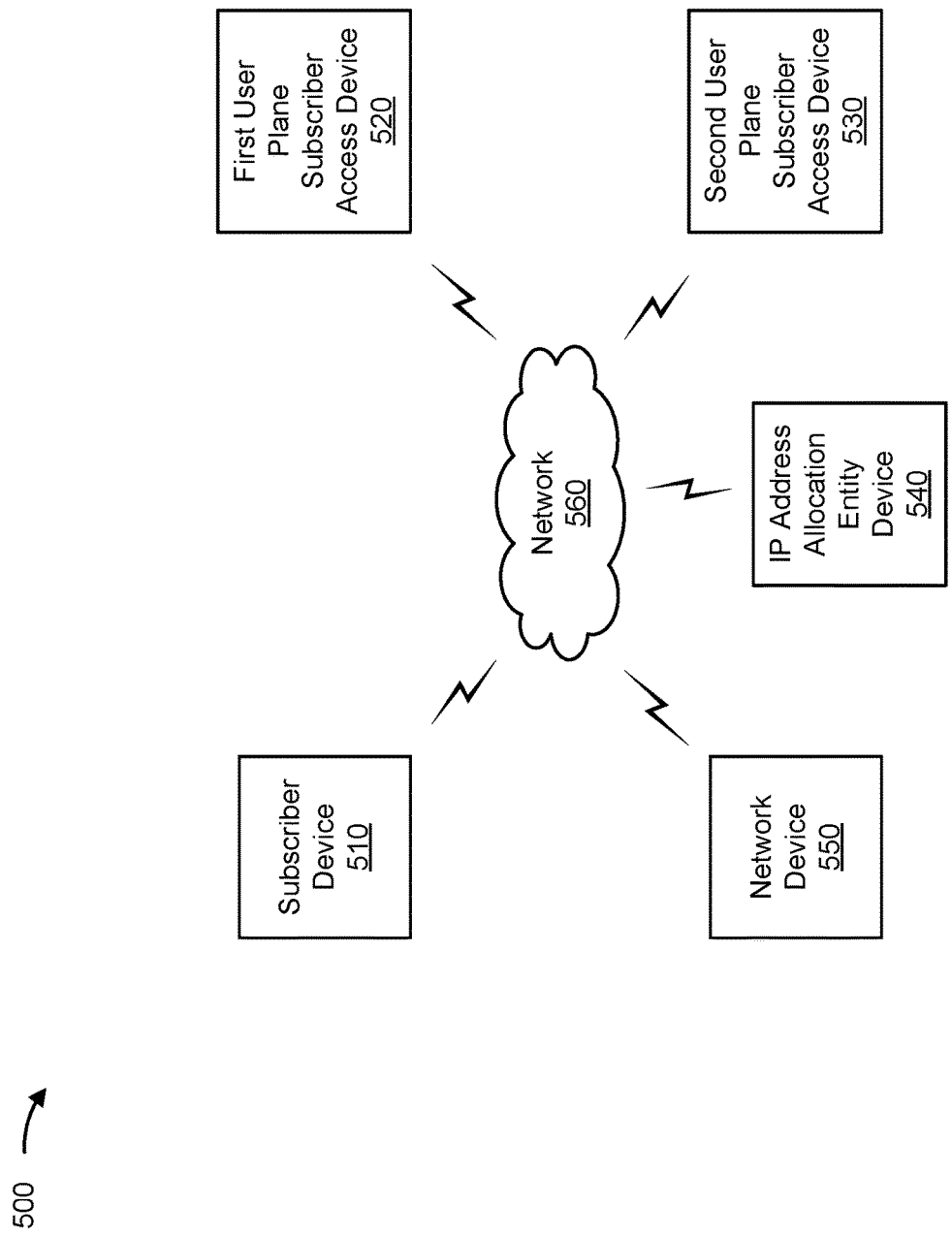
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a subscriber device 510, a first user plane subscriber access device 520, a second user plane subscriber access device 530, an IP address allocation entity device 540, a network device 550, and a network 560. Devices of environment 500 may interconnect via wired connections, wireless connections, or a combination of wired and wireless connections.

The subscriber device 510 may include one or more devices capable of receiving, generating, storing, processing, and/or providing information associated with or based on an IP address. The subscriber device 510 may include a communication device and/or a computing device. For example, the subscriber device 510 may include a wireless communication device, a mobile phone, a laptop computer, a tablet computer, a desktop computer, a wearable communication device (e.g., a smart wristwatch, a pair of smart eyeglasses, a head mounted display, or a virtual reality headset), or a similar type of device.

The first user plane subscriber access device 520 may be a first BNG-UP device, a first AGF-UP device, a first co-located BNG-UP/AGF-UP device, or the like, and the second user plane subscriber access device 530 may be a second BNG-UP device, a second AGF-UP device, a second co-located BNG-UP/AGF-UP device, or the like. For example, a BNG-UP device and/or AGF-UP device may route traffic to and from broadband remote access devices, such as digital subscriber line access multiplexers (DSLAMs), on an Internet service provider (ISP) network, and/or provide services such as marking, policing, and shaping.

The IP address allocation entity device 540 may include any suitable entity configured for allocation (e.g., management, assignment, renewal, release, or the like) of IP addresses. The IP address allocation entity device 540 may be a DHCP server, an SMF and/or a UPF (e.g., one or more servers that include an SMF and/or a UPF), or the like.

The network device 550 may be a control plane subscriber access device, such as a BNG-CP device, an AGF-CP device, a co-located BNG-CP/AGF-CP, or the like. The network device 550 may be responsible for managing the first user plane subscriber access device 520 and the second user plane subscriber access device 530. For example, the network device 550 may be responsible for relaying messages to and from the first user plane subscriber access device 520 and the second user plane subscriber access device 530, controlling switchovers associated with the first user plane subscriber access device 520 and the second user plane subscriber access device 530, or the like.

The network 560 may include one or more wired and/or wireless networks. For example, the network 560 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 560 enables communication among the devices of environment 500.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
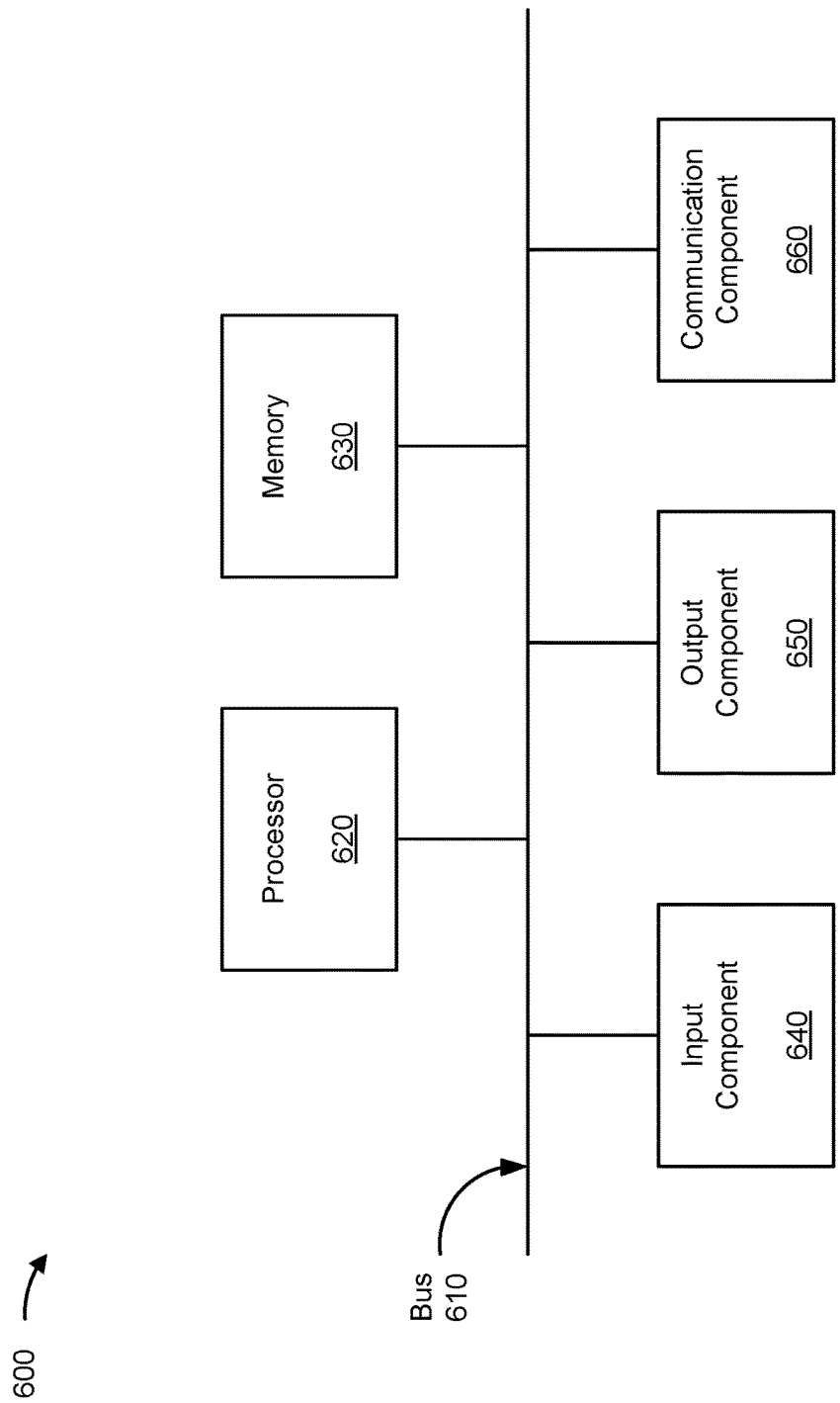
FIG. 6 is a diagram of example components of a device associated with path prioritization for an IP address allocation entity.

FIG. 6 is a diagram of example components of a device 600 associated with path prioritization for an IP address allocation entity. The device 600 may correspond to the subscriber device 510, the first user plane subscriber access device 520, the second user plane subscriber access device 530, the IP address allocation entity device 540, and/or the network device 550. In some implementations, the subscriber device 510, the first user plane subscriber access device 520, the second user plane subscriber access device 530, the IP address allocation entity device 540, and/or the network device 550 may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

Figure 7:
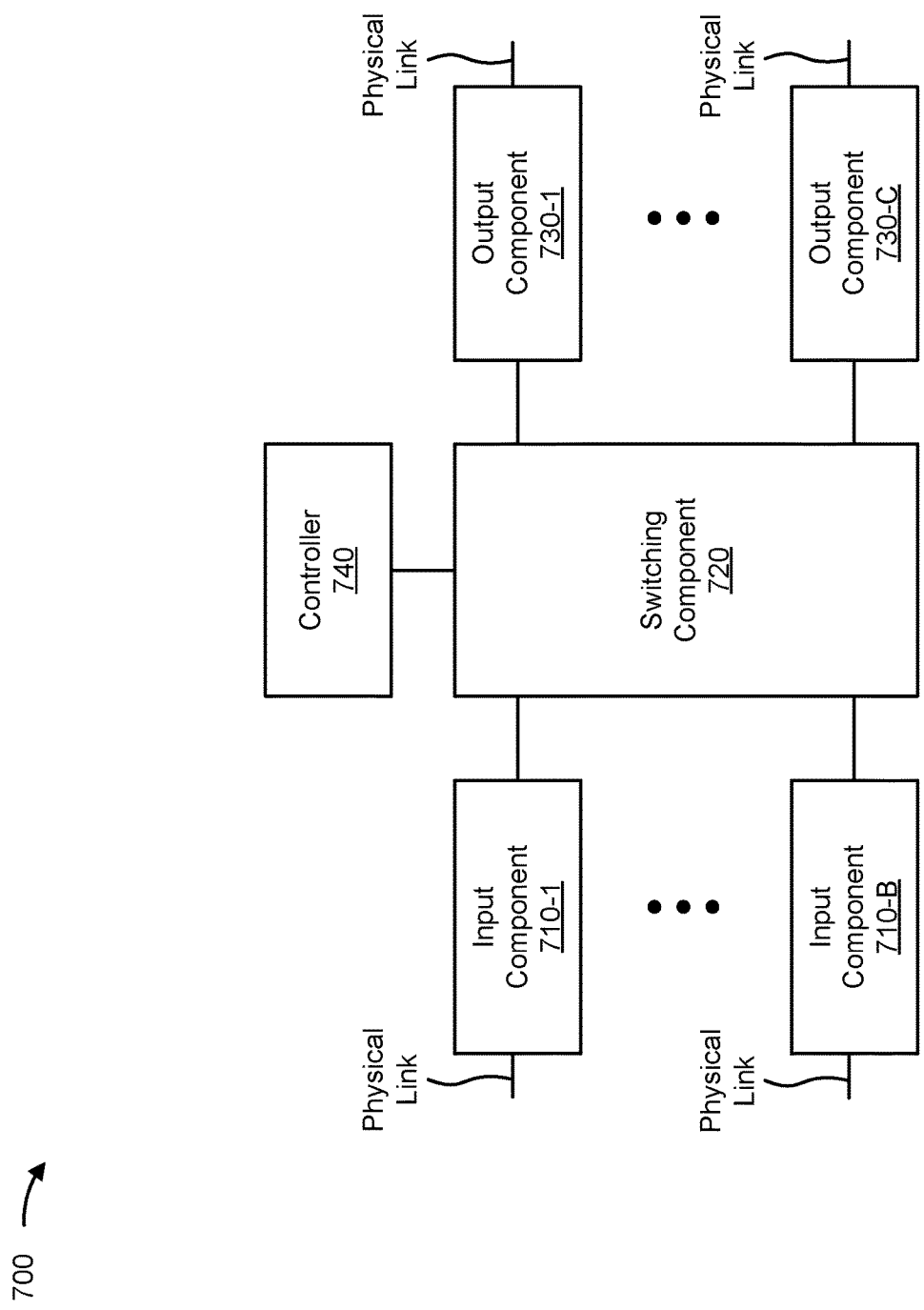
FIG. 7 is a diagram of example components of a device associated with path prioritization for an IP address allocation entity.

FIG. 7 is a diagram of example components of a device 700 associated with path prioritization for an IP address allocation entity. Device 700 may correspond to the first user plane subscriber access device 520, the second user plane subscriber access device 530, and/or the network device 550. In some implementations, the first user plane subscriber access device 520, the second user plane subscriber access device 530, and/or the network device 550 may include one or more devices 700 and/or one or more components of device 700. As shown in FIG. 7, device 700 may include one or more input components 710-1 through 710-B (B≥1) (hereinafter referred to collectively as input components 710, and individually as input component 710), a switching component 720, one or more output components 730-1 through 730-C (C≥1) (hereinafter referred to collectively as output components 730, and individually as output component 730), and a controller 740.

Input component 710 may be one or more points of attachment for physical links and may be one or more points of entry for incoming traffic, such as packets. Input component 710 may process incoming traffic, such as by performing data link layer encapsulation or decapsulation. In some implementations, input component 710 may transmit and/or receive packets. In some implementations, input component 710 may include an input line card that includes one or more packet processing components (e.g., in the form of integrated circuits), such as one or more interface cards (IFCs), packet forwarding components, line card controller components, input ports, processors, memories, and/or input queues. In some implementations, device 700 may include one or more input components 710.

Switching component 720 may interconnect input components 710 with output components 730. In some implementations, switching component 720 may be implemented via one or more crossbars, via busses, and/or with shared memories. The shared memories may act as temporary buffers to store packets from input components 710 before the packets are eventually scheduled for delivery to output components 730. In some implementations, switching component 720 may enable input components 710, output components 730, and/or controller 740 to communicate with one another.

Output component 730 may store packets and may schedule packets for transmission on output physical links. Output component 730 may support data link layer encapsulation or decapsulation, and/or a variety of higher-level protocols. In some implementations, output component 730 may transmit packets and/or receive packets. In some implementations, output component 730 may include an output line card that includes one or more packet processing components (e.g., in the form of integrated circuits), such as one or more IFCs, packet forwarding components, line card controller components, output ports, processors, memories, and/or output queues. In some implementations, device 700 may include one or more output components 730. In some implementations, input component 710 and output component 730 may be implemented by the same set of components (e.g., and input/output component may be a combination of input component 710 and output component 730).

Controller 740 includes a processor in the form of, for example, a central processing unit (CPU), a graphics processing unit (GPU), an accelerated processing unit (APU), a microprocessor, a microcontroller, a digital signal processor (DSP), an field-programmable gate array (FPGA), an application-specific integrated circuit (ASIC), and/or another type of processor. The processor is implemented in hardware, firmware, or a combination of hardware and software. In some implementations, controller 740 may include one or more processors that can be programmed to perform a function.

In some implementations, controller 740 may include a RAM, a ROM, and/or another type of dynamic or static storage device (e.g., a flash memory, a magnetic memory, an optical memory, etc.) that stores information and/or instructions for use by controller 740.

In some implementations, controller 740 may communicate with other devices, networks, and/or systems connected to device 700 to exchange information regarding network topology. Controller 740 may create routing tables based on the network topology information, may create forwarding tables based on the routing tables, and may forward the forwarding tables to input components 710 and/or output components 730. Input components 710 and/or output components 730 may use the forwarding tables to perform route lookups for incoming and/or outgoing packets.

Controller 740 may perform one or more processes described herein. Controller 740 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 740 from another computer-readable medium or from another device via a communication interface. When executed, software instructions stored in a memory and/or storage component associated with controller 740 may cause controller 740 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

FIG. 8 is a flowchart of an example process 800 associated with path prioritization for an IP address allocation entity. In some implementations, one or more process blocks of FIG. 8 are performed by a network device (e.g., network device 550). In some implementations, one or more process blocks of FIG. 8 may be performed by one or more components of device 600, such as processor 620, memory 630, input component 640, output component 650, and/or communication component 660. Additionally, or alternatively, one or more process blocks of FIG. 8 are performed by another device or a group of devices separate from or including the network device, such as device 700.

As shown in FIG. 8, process 800 may include obtaining a switchover indication associated with a switchover of a group of subscriber sessions from a first user plane subscriber access device to a second user plane subscriber access device (block 810). For example, the network device may obtain a switchover indication associated with a switchover of a group of subscriber sessions from a first user plane subscriber access device to a second user plane subscriber access device, as described above.

As further shown in FIG. 8, process 800 may include providing, to the first user plane subscriber access device or the second user plane subscriber access device, an indication to provide, to an IP address allocation entity for which the network device serves as a relay, an indication to prioritize a path from the IP address allocation entity to the second user plane subscriber access device over a path from the IP address allocation entity to the first user plane subscriber access device (block 820). For example, the network device may provide, to the first user plane subscriber access device or the second user plane subscriber access device, an indication to provide, to an IP address allocation entity for which the network device serves as a relay, an indication to prioritize a path from the IP address allocation entity to the second user plane subscriber access device over a path from the IP address allocation entity to the first user plane subscriber access device, as described above.

Process 800 may include additional implementations, such as any single implementation or any combination of implementations described below and/or in connection with one or more other processes described elsewhere herein.

In a first implementation, the first user plane subscriber access device is a first BNG-UP device, and the second user plane subscriber access device is a second BNG-UP device.

In a second implementation, alone or in combination with the first implementation, the IP address allocation entity is a DHCP server.

In a third implementation, alone or in combination with one or more of the first and second implementations, the indication to prioritize the path from the DHCP server to the second BNG-UP device over the path from the DHCP server to the first BNG-UP device prompts the DHCP server to set the second BNG-UP device as a next hop for DHCP control traffic.

In a fourth implementation, alone or in combination with one or more of the first through third implementations, the indication to provide the indication to prioritize the path from the IP address allocation entity to the second user plane subscriber access device over the path from the IP address allocation entity to the first user plane subscriber access device includes an IE carried in a user plane subscriber prefix.

In a fifth implementation, alone or in combination with one or more of the first through fourth implementations, the IP address allocation entity is a DHCP IPv4 server, and the IE includes information associated with the DHCP IPv4 server.

In a sixth implementation, alone or in combination with one or more of the first through fifth implementations, the IP address allocation entity is a DHCP IPv6 server, and the IE includes information associated with the DHCP IPv6 server.

In a seventh implementation, alone or in combination with one or more of the first through sixth implementations, the network device is a control plane subscriber access device.

In an eighth implementation, alone or in combination with one or more of the first through seventh implementations, the control plane subscriber access device includes a BNG-CP device.

In a ninth implementation, alone or in combination with one or more of the first through eighth implementations, the first user plane subscriber access device is a first AGF-UP device, and the second user plane subscriber access device is a second AGF-UP device.

In a tenth implementation, alone or in combination with one or more of the first through ninth implementations, the IP address allocation entity includes a UPF.

In an eleventh implementation, alone or in combination with one or more of the first through tenth implementations, the IP address allocation entity further includes an SMF.

In a twelfth implementation, alone or in combination with one or more of the first through eleventh implementations, the indication to prioritize the path from the UPF to the second AGF-UP device over the path from the UPF to the first AGF-UP prompts the UPF to set the second AGF-UP device as a next hop for IP address allocation control traffic.

In a thirteenth implementation, alone or in combination with one or more of the first through twelfth implementations, the control plane subscriber access device includes an AGF-CP device.

Although FIG. 8 shows example blocks of process 800, in some implementations, process 800 includes additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, by a network device, a switchover indication associated with a switchover of a group of subscriber sessions from a first user plane subscriber access device to a second user plane subscriber access device; and
   providing, by the network device, to the first user plane subscriber access device or the second user plane subscriber access device, an indication to provide, to an internet protocol (IP) address allocation entity for which the network device serves as a relay, an indication to prioritize a path from the IP address allocation entity to the second user plane subscriber access device over a path from the IP address allocation entity to the first user plane subscriber access device.

2. The method of claim 1, wherein the first user plane subscriber access device is a first broadband network gateway user plane (BNG-UP) device, and wherein the second user plane subscriber access device is a second BNG-UP device.

3. The method of claim 2, wherein the IP address allocation entity is a dynamic host configuration protocol (DHCP) server.

4. The method of claim 3, wherein the indication to prioritize the path from the DHCP server to the second BNG-UP device over the path from the DHCP server to the first BNG-UP device prompts the DHCP server to set the second BNG-UP device as a next hop for DHCP control traffic.

5. The method of claim 2, wherein the indication to provide the indication to prioritize the path from the IP address allocation entity to the second user plane subscriber access device over the path from the IP address allocation entity to the first user plane subscriber access device includes an information element (IE) carried in a user plane subscriber prefix.

6. The method of claim 5, wherein the IP address allocation entity is a dynamic host configuration protocol (DHCP) IP version 4 (IPv4) server, and wherein the IE includes information associated with the DHCP IPv4 server.

7. The method of claim 5, wherein the IP address allocation entity is a dynamic host configuration protocol (DHCP) IP version 6 (IPv6) server, and wherein the IE includes information associated with the DHCP IPv6 server.

8. The method of claim 1, wherein the network device is a control plane subscriber access device.

9. The method of claim 8, wherein the control plane subscriber access device includes a broadband network gateway control plane (BNG-CP) device.

10. A network device, comprising:
    one or more memories; and
    one or more processors to:
      obtain a switchover indication associated with a switchover of a group of subscriber sessions from a first user plane subscriber access device to a second user plane subscriber access device; and
      provide, to the first user plane subscriber access device or the second user plane subscriber access device, an indication to provide, to an internet protocol (IP) address allocation entity for which the network device serves as a relay, an indication to prioritize a path from the IP address allocation entity to the second user plane subscriber access device over a path from the IP address allocation entity to the first user plane subscriber access device.

11. The network device of claim 10, wherein the first user plane subscriber access device is a first access gateway function user plane (AGF-UP) device, and wherein the second user plane subscriber access device is a second AGF-UP device.

12. The network device of claim 11, wherein the IP address allocation entity includes a user plane function (UPF).

13. The network device of claim 12, wherein the IP address allocation entity further includes a session management function (SMF).

14. The network device of claim 12, wherein the indication to prioritize the path from the UPF to the second AGF-UP device over the path from the UPF to the first AGF-UP prompts the UPF to set the second AGF-UP device as a next hop for IP address allocation control traffic.

15. The network device of claim 10, wherein the network device is a control plane subscriber access device.

16. The network device of claim 15, wherein the control plane subscriber access device includes an access gateway function control plane (AGF-CP) device.

17. A non-transitory computer-readable medium storing a set of instructions, the set of instructions comprising:
one or more instructions that, when executed by one or more processors of a network device, cause the network device to:
obtain a switchover indication associated with a switchover of a group of subscriber sessions from a first user plane subscriber access device to a second user plane subscriber access device; and
provide, to the first user plane subscriber access device or the second user plane subscriber access device, an indication to provide, to an internet protocol (IP) address allocation entity for which the network device serves as a relay, an indication to prioritize a path from the IP address allocation entity to the second user plane subscriber access device over a path from the IP address allocation entity to the first user plane subscriber access device.

18. The non-transitory computer-readable medium of claim 17, wherein the first user plane subscriber access device is a first broadband network gateway user plane (BNG-UP) device, and wherein the second user plane subscriber access device is a second BNG-UP device.

19. The non-transitory computer-readable medium of claim 17, wherein the first user plane subscriber access device is a first access gateway function user plane (AGF-UP) device, and wherein the second user plane subscriber access device is a second AGF-UP device.

20. The non-transitory computer-readable medium of claim 17, wherein the network device is a control plane subscriber access device.

* * * * *